United States Patent Office 3,551,361
Patented Dec. 29, 1970

3,551,361
METHOD OF FOAMING AN OLEFIN POLYMER USING STARCH AS A NUCLEATING AGENT
Donald G. Needham, Bartlesville, Okla., assignor to Phillips Petroleum Company, a corporation of Delaware
No Drawing. Filed Oct. 13, 1967, Ser. No. 675,065
Int. Cl. C08j 1/22; C08f 47/10
U.S. Cl. 260—2.5                                    6 Claims

ABSTRACT OF THE DISCLOSURE

A method for foaming a foamable polymer composition wherein a starch is employed to control the foaming process and produce a foamed article having a more uniform cell size.

---

This invention relates to a new and improved method for foaming a foamable polymer composition. In particular, this invention relates to a new and improved method for foaming a foamable polymer compositon using a carbonate foamng agent, the foamable polymer containing at least one 1-olefin.

Heretofore carbonate foaming agents such as sodium bicarbonate have been suggested for use in various polymers. However, these foaming agents can have a tendency for uncontrolled foaming which produces unsatisfactory cell (bubble) structure in the foamed article in that the cells are not uniform in size, some cells being very much larger than other cells, and the plastic membrane two adjacent cells sometimes is ruptured thereby forming a single very large cell. This nonuniform cell structure, although tolerable in an article which need not necessarily be pleasing to the eye, e.g., a sponge, is completely intolerable for fabricated articles such as buckets, trays, and the like which must be pleasing to the eye of the consumer. Therefore, even though carbonate foaming agents are among the most inexpensive and most readily available foaming agents known, they have heretofore not been as widely employed in industry as is possible.

Quite surprisingly, it has now been found that carbonate foaming agents can be controlled to produce uniform foaming, i.e., a cell structure wherein the cells are substantially all the same size and there is substantially no rupturing of the plastic membrane between adjacent cells, by the use of small but effective foam controlling amounts of starch.

The foamed polymer produced in accordance with this invention is useful for making all types of articles such as buckets, trays, waste paper backets, and the like.

Accordingly, it is an object of this invention to provide a new and improved method for foaming foamable polymer compositions.

It is a particular object of this invention to provide a new and improved method for forming foamed articles which have a uniform cell structure.

It is another object of this invention to provide a new and improved method for controlling the foaming characteristics of carbonate foaming agents.

Other aspects, objects, and the several advantages of this invention will be apparent to one skilled in the art from the following description and appended claims.

According to this invention, any foamable polymer composition has incorporated therein, in any conventional manner, at least one inorganic carbonate foaming agent selected from the group consisting of alkali metal carbonates and bicarbonates and ammonium carbonate and bicarbonate such as sodium bicarbonate, sodium carbonate, ammonium carbonate, and ammonium bicarbonate, and an amount of starch which is effective to control the foaming of the particular foaming agent or agents employed to thereby produce a finely foamed product which has a more uniform cell size than is normally obtained when the carbonate foaming agent or agents are employed in the absence of starch.

The amount of starch employed can very widely depending upon the particular foaming agents employed, the amount of those foaming agents that is employed, the polymers in which the foaming agents are employed, and the like. Therefore, generally any effective controlling amount of starch can be employed. A general, but not limiting, range of starch which can be employed is from about 0.1 to about 5 weight percent starch based upon the total weight of polymer to be foamed.

Generally, any starch product can be employed. Starch from various sources such as grains (corn, wheat, rice, sorghum, and the like), roots and tubers (tapioca, cassava, arrowroot, potatoes, sweet potatoes, and the like), pith from certain palms such as sago, and the like can be employed in this invention.

The particular identification of starch, other than by its source, is not yet known to a certainty by those skilled in the art and therefore starch is best classified by its source, i.e., grains, roots, tubers, and the like. However, it presently appears that starch is composed of glucopyranose units joined together by alpha-glucosidic linkages, the approximate formula being $(C_6H_{10}O_5)_n$ where $n$ is probably greater than 1000. Usually starch is made up of both a linear polymer identified as amylose (200 to 1000 glucopyranose units joined to each other through alpha-1,4-glucosidic linkages) and a branched polymer identified as amylopectin (at least 1500 glucopyranose units joined by a majority of alpha-1,4-glucosidic linkages and, at the point of branching, a minority of alpha-1,6-glucodic linkages), the formulae of these two polymers being fully and completely set forth in the Encyclopedia of Chemical Technology by Kirk-Othmer, volume 12, the chapter on Starches and particularly page 766, The Interscience Encyclopedia, Incorporated, New York, 1954, the disclosure of which is hereby incorporated herein by reference.

Any foamable polymer composition can be employed in this invention. An extremely large member of polymers are applicable to this invention, a representative group being polymers of 1-olefins such as polyethylene, polypropylene, copolymers of at least one of ethylene, propylene, butene-1, and the like, the 1-olefins preferably containing from 2 to 8 carbon atoms per molecule, inclusive, specifically the group consisting of a homopolymer of ethylene, a homopolymer of propylene, copolymers of two or more of ethylene, propylene, and butene-1, and blends thereof are satisfactory; natural rubber; rubbery synthetic polymers such as polymers containing at least 40 weight percent based upon the total weight of the polymer of at least one conjugated diene containing from 4 to 12 carbon atoms per molecule, inclusive; copolymers of one or more conjugated dienes such as a terpolymer of ethylene, propylene, and a conjugated diene such as butadiene; copolymers of one or more conjugated diene and one or more monovinyl substituted aromatic compounds containing from 8 to 14 carbon atoms per molecule, inclusive, such as styrene; copolymers of acrylonitrile, butadiene, and styrene; polyvinyl chloride; polyvinylidene chloride; acrylic polymers; alkyd resins; epoxys; polyamides; cellulose acetate; homopolymers or copolymers of at least one monovinyl substituted aromatic compound as defined above, e.g., polystyrene; copolymers of styrene and acrylonitrile; polyesters; polycarbonates; and the like. These and other suitable foamable polymers are known in the art and commercially available as shown in the Modern Plastics Encyclopedia, 1967, September 1966/ volume 44, No. 1A, published by McGraw-Hill, Incorporated, New York.

Generally, any amount of carbonate foaming agent or agents can be employed which amount is effective for forming the desired foamed product. Generally, from about 1 to about 10 weight percent of carbonate foaming agent is employed based upon the total weight of the polymer to be foamed.

The foaming agent and starch are mixed with or otherwise incorporated in the polymer to be foamed in any conventional manner such as the conventional technique of dry mixing polymer pellets with the foaming agent and starch at room temperature (about 25° C.) under ambient atmosphere and pressure.

Of course, other known techniques for forming the blend of foaming agent and starch can be employed, e.g., solution or dispersion mixing.

The thus formed foamable polymer composition can be foamed in any conventional manner such as by melt extruding the foamable polymer composition or by injection molding the foamable polymer composition into the desired article.

Conventional additives such as pigments, antioxidants, UV stabilizers, scent agents, plasticizers, and the like can also be incorporated in the polymer to be foamed.

After foaming, the polymer contains an even and uniformly dispersed cell structure composed of a plurality of cells each of which maintain their own separate identity in that there is no open connection between adjacent cells and each cell is of substantially the same size as the other. Thus there is no agglomeration of cells producing large holes in the interior of the foamed polymer nor is there a tendency toward pitting of the surface of the foamed polymer caused by large cells or groups of interconnected cells breaking through the surface of the polymer.

EXAMPLE

Polyethylene having a density of 0.955 at 25° C. and a melt index of 17 (ASTM D–1238–62T, Condition E) in the form of right cylindrical pellets ⅛-inch in height and ⅛-inch in diameter were dry mixed for 10 minutes, at about 70° F., in air and under ambient pressure with 2 weight percent, based on the total weight of the polyethylene present, of sodium bicarbonate. This polymer composition was injection molded at 350° F. in the form of an open topped bucket.

A second run was conducted in the same manner as the first run set forth above except that, in addition to the 2 weight percent sodium bicarbonate, 1 weight percent corn starch was employed.

Sections were cut out of the buckets formed from both runs and the foamed cross section of these sections examined visually. The section taken from the bucket formed from polymer containing only the sodium bicarbonate contained a noticeably large number of very large and very small cells and some very large pores formed from the coalescence of two or more cells while the section taken from the bucket formed from the polymer containing both sodium bicarbonate and corn starch contained a uniform dispersion of substantially equi-sized cells without any apparent coalescence of two or more such cells. Thus, the corn starch had a significant effect on controlling the cell structure formed by the sodium bicarbonate.

Three additional runs were carried out in the same manner as set forth for Run 1 hereinabove except that 1 weight percent sodium bicarbonate was employed and in each of the runs 0.5 weight percent of a different type starch was employed, the three starches employed being potato starch, soluble starch (i.e., starch of any source that is soluble or dispersible in hot water, Condensed Chemical Dictionary, 5th edition, Reinhold Publishing Co., New York, page 1018, 1956), and corn starch. In addition, 0.33 weight percent ferric oxide and 0.033 weight percent carbon black, both weight percentages being based upon the total weight of the polymer to be foamed, was added as pigment in each of the three additional runs during the dry mixing of the polymer pellets with the sodium bicarbonate and the starch. A section was taken from the injection molded buckets formed from each of the three additional runs and visually examined. In each section the cell structure was uniform in size and uniformly dispersed throughout the section thereby indicating that the different starches each had a controlling effect on the foaming characteristics of the sodium bicarbonate.

Reasonable modification and variation are possible within the scope of this disclosure without departing from the spirit and scope thereof.

That which is claimed is:

1. In a method for foaming a foamable polymer composition selected from the group consisting of a homopolymer of ethylene, a homopolymer of propylene, copolymers of two or more of ethylene, propylene, and butene-1, and blends thereof, using at least one of alkali metal carbonates and bicarbonates and ammonium carbonate and bicarbonate as a foaming agent, the improvement comprising employing starch in said polymer composition in an amount effective to control the foaming of said foaming agent and produce a foamed product having a more uniform cell size than is obtained when the foaming agent is employed in the absence of said starch.

2. The method according to claim 1 wherein the starch is employed in amounts of the range of from about 0.1 to about 5 weight percent based upon the total weight of the polymer to be foamed.

3. The method according to claim 1 wherein said starch is at least one of a grain starch, a root starch, and a tuber starch.

4. The method according to claim 1 wherein the foaming agent is at least one selected from the group consisting of sodium bicarbonate, sodium carbonate, ammonium carbonate, ammonium bicarbonate.

5. The method according to claim 1 wherein sodium bicarbonate is employed as a foaming agent, and the starch employed is selected from the group consisting of potato starch, soluble starch, and corn starch.

6. The method according to claim 5 wherein the foamable polymer is a homopolymer of ethylene and the starch is employed in an amount of from about 0.1 to about 5 weight percent based upon the total weight of the polyethylene to be foamed.

References Cited

UNITED STATES PATENTS

| | | | |
|---|---|---|---|
| 3,072,584 | 1/1963 | Karpovich | 260—2.5 |
| 3,293,196 | 12/1966 | Nakamori | 260—2.5 |

MURRAY TILLMAN, Primary Examiner

M. FOELAK, Assistant Examiner

U.S. Cl. X.R.

260—17.4, 41, 41.5, 722, 724, 749